(12) United States Patent
Sayyed et al.

(10) Patent No.: US 12,093,393 B2
(45) Date of Patent: Sep. 17, 2024

(54) SYSTEMS AND METHODS FOR SAFEGUARDING UPDATES TO A BASIC INPUT/OUTPUT SYSTEM OF AN INFORMATION HANDLING SYSTEM

(71) Applicant: Dell Products L.P., Round Rock, TX (US)

(72) Inventors: Ibrahim Sayyed, Georgetown, TX (US); Adolfo S. Montero, Pflugerville, TX (US); Amit K. Tiwari, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 17/590,305

(22) Filed: Feb. 1, 2022

(65) Prior Publication Data

US 2023/0244788 A1 Aug. 3, 2023

(51) Int. Cl.
*G06F 21/57* (2013.01)
*G06F 8/65* (2018.01)
*G06F 9/445* (2018.01)
*G06F 21/54* (2013.01)

(52) U.S. Cl.
CPC ............ *G06F 21/572* (2013.01); *G06F 8/65* (2013.01); *G06F 9/44505* (2013.01); *G06F 21/54* (2013.01); *G06F 21/575* (2013.01)

(58) Field of Classification Search
CPC ...... G06F 21/572; G06F 8/65; G06F 9/44505; G06F 21/54; G06F 21/575
See application file for complete search history.

(56) References Cited

U.S. PATENT DOCUMENTS

2019/0286825 A1* 9/2019 Ponnuru ................ G06F 8/65
2020/0257518 A1* 8/2020 Liedtke ............. G06F 21/572

* cited by examiner

*Primary Examiner* — Normin Abedin
(74) *Attorney, Agent, or Firm* — Jackson Walker L.L.P.

(57) ABSTRACT

A method may include, in an operating system executing on an information handling system, obtaining information regarding basic input/output system (BIOS) configuration security controls, evaluating the BIOS configuration security controls to determine if the BIOS configuration security controls satisfy a standard for performing a BIOS-managed BIOS firmware update, and if the BIOS configuration security controls fail to satisfy the standard for performing the BIOS-managed BIOS firmware update, configuring the BIOS configuration security controls to enforce a secure BIOS update policy on a subsequent boot of the information handling system and triggering a warm reboot of the information handling system.

16 Claims, 3 Drawing Sheets

US 12,093,393 B2

SYSTEMS AND METHODS FOR SAFEGUARDING UPDATES TO A BASIC INPUT/OUTPUT SYSTEM OF AN INFORMATION HANDLING SYSTEM

TECHNICAL FIELD

The present disclosure relates in general to information handling systems, and more particularly to methods and systems for ensuring security of updates to a basic input/output system (BIOS) of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A critical component of modern information handling systems is the BIOS. A BIOS may comprise boot firmware configured to be the first code executed by a processor of an information handling system when the information handling system is booted and/or powered on, and serves to initialize information handling resources of the information handling system and/or initialize interoperation of information handling system with other information handling systems.

Due to its critical nature in the boot process of an information handling system, deliberate misconfigurations of BIOS firmware may provide an attacker with a bypass of an information handling system's security features, which may go undetected by antivirus software. Misconfigurations of hardware and firmware have increasingly become an oft-used vector for more advanced attacks in the situations when the hardware's owner cannot monitor physical access to the hardware at all times, such as when leaving a notebook computer in a checked bag, surrendering a notebook computer for a foreign customs inspection, or simply leaving a notebook computer in a hotel room. All of these situations, and others, may serve as opportunities for a malicious actor to install a BIOS implant. Most common examples of physical attacks include firmware or hardware implant installation, exploiting hardware vulnerabilities to bypass full disk encryption, or even simpler attacks on data confidentiality such as hard drive cloning.

Despite most implementations of BIOS being armed with security controls to raise a security level of hardware to reduce attack surface and minimize exploitation of compromised firmware, many users disable BIOS security controls and/or change BIOS configuration options, thus disabling the boot path's security in order to customize an operating system. Such modifications may put an information handling system at risk, especially when the vendor of the information handling system provides system critical software and/or firmware updates. For example, a user may be unlikely to detect instructions via endpoint security controls, and malicious code may evade detection while delivering malicious payloads to a compromised information handling system.

As another example, an outdated BIOS with known security issues may put an information handling system at risk when a user attempts to update the information handling system using the old version of the BIOS as a Launchpad to trigger a firmware update. To illustrate, if pre-operating system routines inside an outdated BIOS try to download a new version of BIOS through a network, and the existing BIOS has vulnerabilities, during the network download operation the existing BIOS may expose a BIOS update path to network-induced malware.

Further, if an information handling system is infected with malicious code, performing a BIOS update on the infected system is risky. In this case, it would not be desirable to pass a new BIOS payload through memory that has resident malware modules running which may actively be seeking other critical system modules to modify in memory.

SUMMARY

In accordance with the teachings of the present disclosure, the disadvantages and problems associated with updating BIOS firmware may be reduced or eliminated.

In accordance with embodiments of the present disclosure, a method may include, in an operating system executing on an information handling system, obtaining information regarding basic input/output system (BIOS) configuration security controls, evaluating the BIOS configuration security controls to determine if the BIOS configuration security controls satisfy a standard for performing a BIOS-managed BIOS firmware update, and if the BIOS configuration security controls fail to satisfy the standard for performing the BIOS-managed BIOS firmware update, configuring the BIOS configuration security controls to enforce a secure BIOS update policy on a subsequent boot of the information handling system and triggering a warm reboot of the information handling system.

In accordance with embodiments of the present disclosure, an article of manufacture may include a non-transitory computer-readable medium and computer-executable instructions carried on the computer-readable medium, the instructions readable by a processor, the instructions, when read and executed, for causing the processor to, in an operating system executing on an information handling system: obtain information regarding basic input/output system (BIOS) configuration security controls, evaluate the BIOS configuration security controls to determine if the BIOS configuration security controls satisfy a standard for performing a BIOS-managed BIOS firmware update, and if the BIOS configuration security controls fail to satisfy the standard for performing the BIOS-managed BIOS firmware update configure the BIOS configuration security controls to enforce a secure BIOS update policy on a subsequent boot of the information handling system and trigger a warm reboot of the information handling system.

A method comprising, in a basic input/output system (BIOS) of an information handling system during a boot session of the information handling system, determining if a flag has been set by an operating system of the information handling system indicating that the operating system has applied a secure profile to the BIOS, if the flag has been set by the operating system of the information handling system indicating that the operating system has applied a secure profile to the BIOS, applying a secure BIOS configuration profile to execution of the BIOS, and performing a BIOS-managed BIOS update based on the secure BIOS configuration profile.

An article of manufacture comprising a non-transitory computer-readable medium and computer-executable instructions carried on the computer-readable medium, the instructions readable by a processor, the instructions, when read and executed, for causing the processor to, in a basic input/output system (BIOS) of an information handling system during a boot session of the information handling system" determine if a flag has been set by an operating system of the information handling system indicating that the operating system has applied a secure profile to the BIOS; if the flag has been set by the operating system of the information handling system indicating that the operating system has applied a secure profile to the BIOS, apply a secure BIOS configuration profile to execution of the BIOS; and perform a BIOS-managed BIOS update based on the secure BIOS configuration profile.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
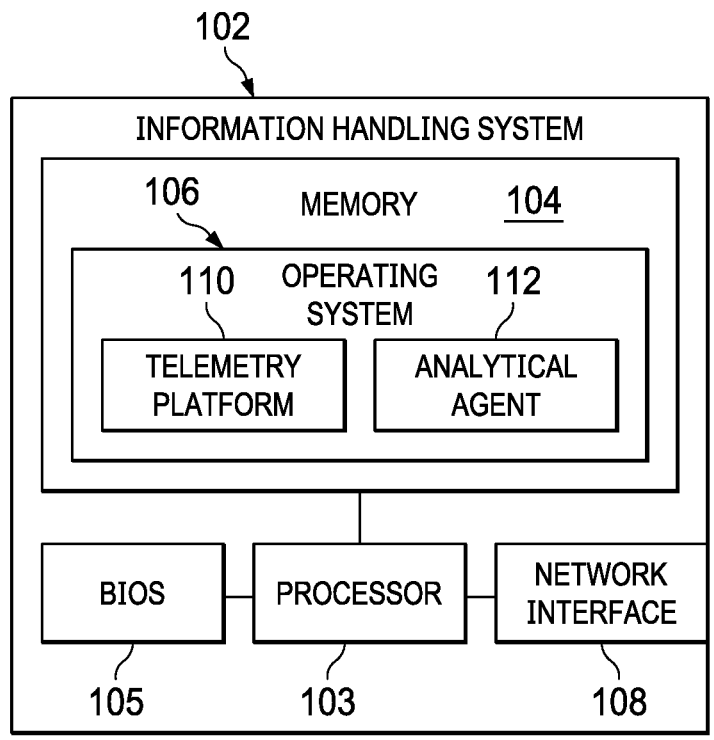
FIG. 1 illustrates a block diagram of an information handling system, in accordance with embodiments of the present disclosure.

FIG. 1 illustrates a block diagram of an example information handling system 102, in accordance with embodiments of the present disclosure. In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a BIOS 105 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

As shown in FIG. 1, a telemetry platform 110 and an analytical agent 112 may be included within operating system 106 or may otherwise be executable upon operating system 106.

Telemetry platform 110 may include a program of instructions configured to, when read and executed by processor 103, receive BIOS configuration security controls and evaluate an information handling system boot within a BIOS boot security context, as described in greater detail below.

Analytical agent 112 may include a program of instructions configured to, when read and executed by processor 103, receive information regarding the information handling system boot within the BIOS boot security context in order to carry out BIOS security validation and determine if configuration is secure enough to allow BIOS-managed updates on the existing BIOS 105, as described in greater detail below.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both.

In addition to processor 103, memory 104, BIOS 105, and network interface 108, information handling system 102 may include one or more other information handling resources.

Figure 2:
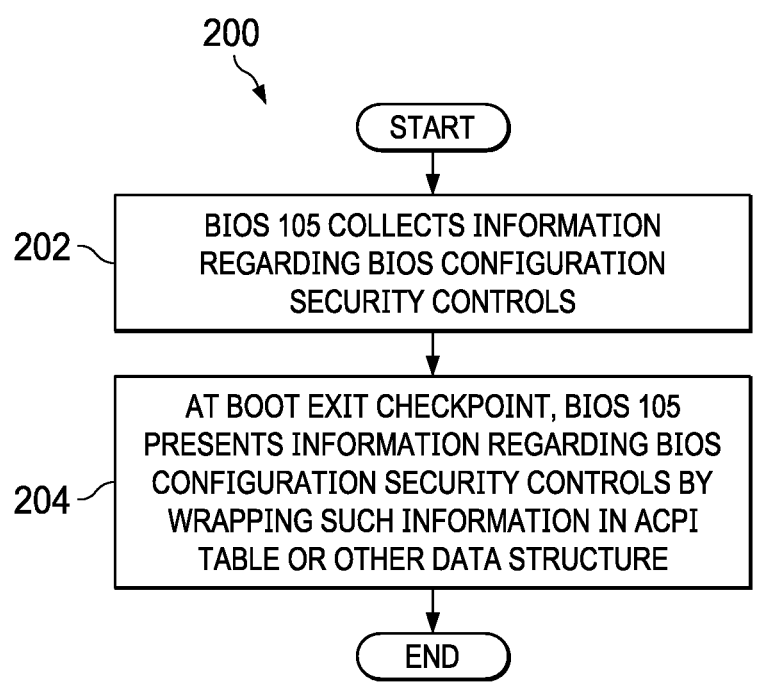
FIG. 2 illustrates a flowchart of an example method for presenting pre-operating system BIOS security controls to an operating system, in accordance with embodiments of the present disclosure.

FIG. 2 illustrates a flowchart of an example method 200 for presenting pre-operating system BIOS security controls to an operating system, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, after a reset, powering-on, or other initialization of information handling system 102, BIOS 105 may execute and during such execution, collect information regarding BIOS configuration security controls. For example, BIOS-IQ telemetry may be used to monitor the security state of BIOS 105 and collect the information regarding BIOS configuration security controls.

At step 204, at a boot exit checkpoint, BIOS 105 may present the information regarding BIOS configuration security controls in a structured manner by wrapping such information in an Advanced Configuration and Power Interface (ACPI) table or other suitable data structure. As described below with respect to method 300 of FIG. 3, telemetry platform 110 may obtain the information regarding BIOS configuration security controls from such ACPI table or other data structure, and evaluate the BIOS configuration system security controls. After completion of step 204, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

Figure 3:
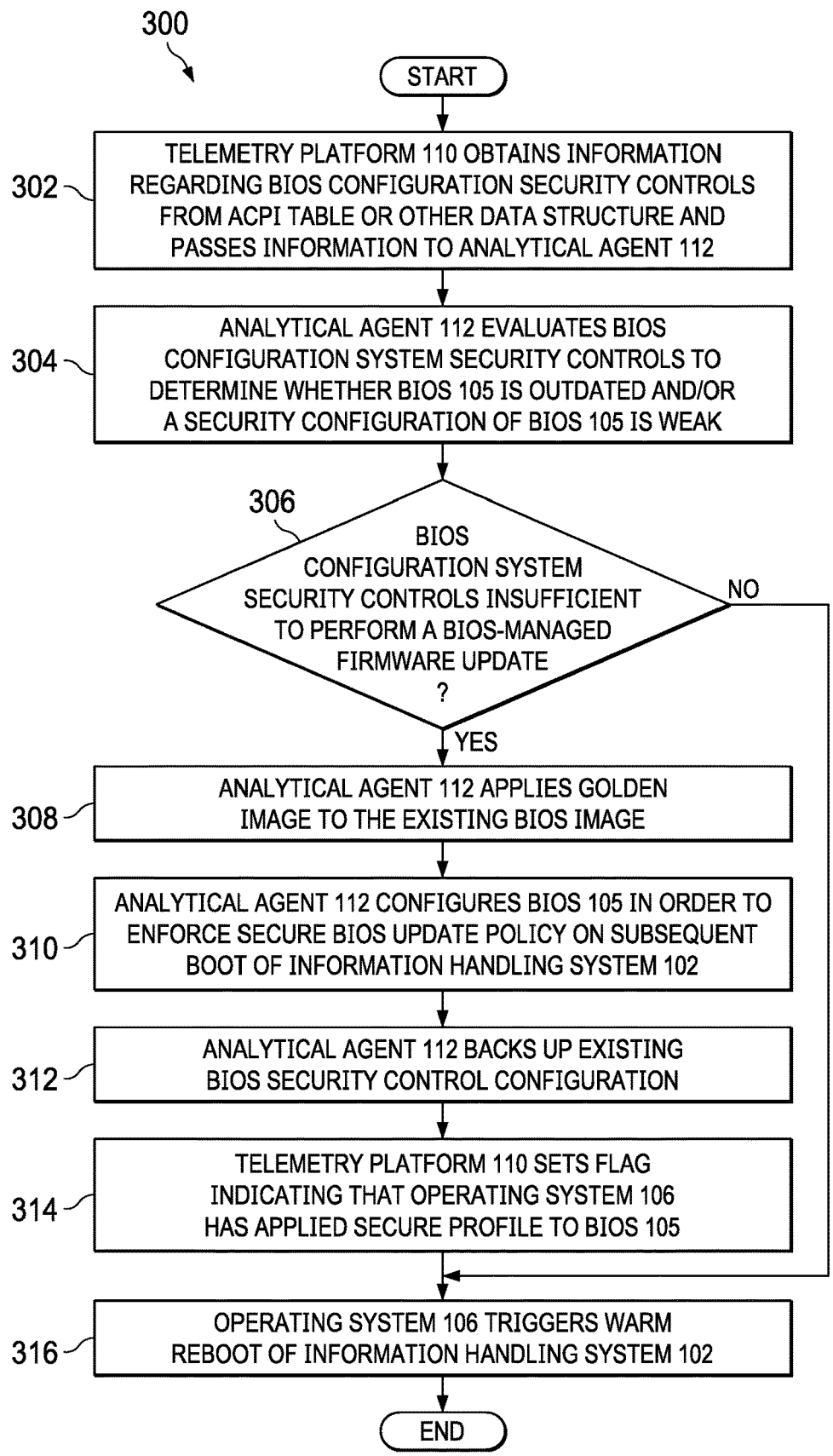
FIG. 3 illustrates a flowchart of an example method for evaluating pre-operating system BIOS security controls to an operating system, in accordance with embodiments of the present disclosure.

FIG. 3 illustrates a flowchart of an example method for evaluating pre-operating system BIOS security controls to an operating system, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, telemetry platform 110 may obtain the information regarding BIOS configuration security controls from such ACPI table or other data structure and pass such information to analytical agent 112. At step 304, analytical agent 112 may evaluate the BIOS configuration system security controls to determine whether BIOS 105 is outdated and/or a security configuration of BIOS 105 is weak (e.g., due to user configuration changes). In some embodiments, telemetry platform 110 may compare information regarding BIOS configuration security controls to a golden BIOS image generated by a vendor of information handling system 102, wherein such golden BIOS image represents a known BIOS image with security controls known by the vendor to be sufficient for applying a BIOS-managed firmware update.

At step 306, if analytical agent 112 evaluates that the BIOS configuration system security controls are insufficient (e.g., fails to meet a minimum security standard, as may be the case where BIOS 105 is outdated and/or a security configuration of BIOS 105 is weak) to perform a BIOS-managed firmware update, method 300 may proceed to step 308. Otherwise, method 300 may proceed to step 316.

At step 308, analytical agent 112 may apply the golden image to the existing BIOS image, in order to cut off potential paths that may expand a malicious attack. At step 310, analytical agent 112 may configure BIOS 105 in order to enforce a secure BIOS update policy on a subsequent boot of information handling system 102. For example, operating system 106 may disable one or more BIOS features that may compromise BIOS security, including disabling boot deviation from BIOS 105, disabling certificate setup options, disabling Secure Boot bypass, and disabling any change in boot order. As a further example, operating system 106 may disable one or more system management interrupt (SMI) vectors and mute any unverified paths for obtaining update images.

At step 312, analytical agent 112 may further back up the existing BIOS security control configuration (e.g., by copying BIOS attributes onto an EFI system partition).

At step 314, telemetry platform 110 may set a flag (e.g., via Windows Management Interface runtime methods) indicating that operating system 106 has applied a secure profile to BIOS 105.

At step 316, operating system 106 may trigger a warm reboot of information handling system 102. After completion of step 316, method 300 may end.

Although FIG. 3 discloses a particular number of steps to be taken with respect to method 300, it may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system operable to implement method 300. In certain embodiments, method 300 may be implemented partially or fully in software and/or firmware embodied in computer-readable media.

Figure 4:
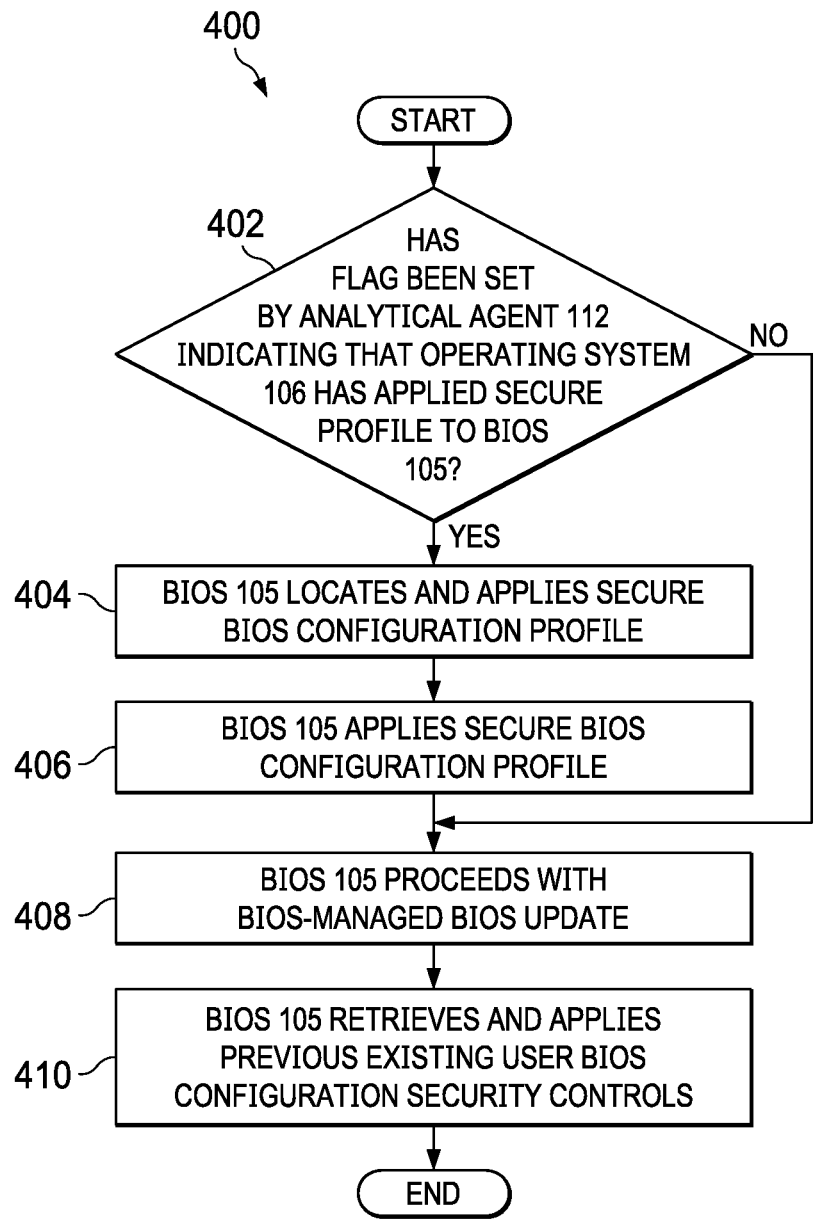
FIG. 4 illustrates a flowchart of an example method for a secure BIOS update, in accordance with embodiments of the present disclosure.

FIG. 4 illustrates a flowchart of an example method for a secure BIOS update, in accordance with embodiments of the present disclosure. According to certain embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, upon a reboot of information handling system 102, BIOS 105 may determine if a flag has been set by analytical agent 112 indicating that operating system 106 has applied a secure profile to BIOS 105. If the flag has been set, method 400 may proceed to step 404. Otherwise, method 400 may proceed to step 408.

At step 404, BIOS 105 may locate a secure BIOS configuration profile (e.g., from a Serial Peripheral Interface firmware volume). At step 406, BIOS 105 may apply the secure BIOS configuration profile. Such configuration profile may include security controls established by analytical agent 112 during method 300, including enabling Secure Boot, enabling boot path security, allowing BIOS downgrade, enabling clearing of BIOS logs, and/or other security features.

At step 408, BIOS 105 may proceed with a BIOS-managed BIOS update. At step 410, after BIOS update is completed, BIOS 105 may retrieve the previous existing user BIOS configuration security controls (e.g., from the EFI secure partition), and apply such user BIOS configuration security controls. After completion of step 410, method 400 may end.

Although FIG. 4 discloses a particular number of steps to be taken with respect to method 400, it may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, components thereof or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, in an operating system executing on an information handling system:
    obtaining information regarding basic input/output system (BIOS) configuration security controls;
    evaluating the BIOS configuration security controls to determine if the BIOS configuration security controls satisfy a standard for performing a BIOS-managed BIOS firmware update; and
    if the BIOS configuration security controls fail to satisfy the standard for performing the BIOS-managed BIOS firmware update:
        configuring the BIOS configuration security controls to enforce a secure BIOS update policy on a subsequent boot of the information handling system; and
        triggering a warm reboot of the information handling system.

2. The method of claim 1, the method further comprising, in the operating system, if the BIOS configuration security controls fail to satisfy the standard for performing the BIOS-managed BIOS firmware update, setting a flag to indicate to a BIOS of the information handling system that the operating system has applied a secure profile to the BIOS configuration security controls.

3. The method of claim 1, the method further comprising, in the operating system, if the BIOS configuration security controls fail to satisfy the standard for performing the BIOS-managed BIOS firmware update, backing up existing BIOS configuration security controls to a computer-readable medium, such that the BIOS may reapply the existing BIOS configuration security controls subsequent to a secure BIOS-managed firmware update.

4. The method of claim 1, wherein evaluating the BIOS configuration security controls to determine if the BIOS configuration security controls satisfy the standard for performing the BIOS-managed BIOS firmware update includes comparing the BIOS configuration security controls to a golden BIOS image known to be sufficient for applying the BIOS-managed firmware update.

5. The method of claim 4, the method further comprising, in the operating system, if the BIOS configuration security controls fail to satisfy the standard for performing the BIOS-managed BIOS firmware update, applying the golden BIOS image to an existing BIOS image such that the golden BIOS image executes on the subsequent boot of the information handling system.

6. An article of manufacture comprising:
    a non-transitory computer-readable medium; and
    computer-executable instructions carried on the computer-readable medium, the instructions readable by a processor, the instructions, when read and executed, for causing the processor to, in an operating system executing on an information handling system:
        obtain information regarding basic input/output system (BIOS) configuration security controls;
        evaluate the BIOS configuration security controls to determine if the BIOS configuration security controls satisfy a standard for performing a BIOS-managed BIOS firmware update; and
        if the BIOS configuration security controls fail to satisfy the standard for performing the BIOS-managed BIOS firmware update:
            configure the BIOS configuration security controls to enforce a secure BIOS update policy on a subsequent boot of the information handling system; and
            trigger a warm reboot of the information handling system.

7. The article of claim 6, the instructions for further causing the processor to, in the operating system, if the BIOS configuration security controls fail to satisfy the standard for performing the BIOS-managed BIOS firmware update, set a flag to indicate to a BIOS of the information handling system that the operating system has applied a secure profile to the BIOS configuration security controls.

8. The article of claim 6, the instructions for further causing the processor to, in the operating system, if the BIOS configuration security controls fail to satisfy the standard for performing the BIOS-managed BIOS firmware update, back up existing BIOS configuration security controls, such that the BIOS may reapply the existing BIOS configuration security controls subsequent to a secure BIOS-managed firmware update.

9. The article of claim 6, wherein evaluating the BIOS configuration security controls to determine if the BIOS configuration security controls satisfy the standard for performing the BIOS-managed BIOS firmware update includes comparing the BIOS configuration security controls to a golden BIOS image known to be sufficient for applying the BIOS-managed firmware update.

10. The article of claim 9, the instructions for further causing the processor to, in the operating system, if the BIOS configuration security controls fail to satisfy the standard for performing the BIOS-managed BIOS firmware update, applying the golden BIOS image to an existing BIOS image such that the golden BIOS image executes on the subsequent boot of the information handling system.

11. A method comprising, in a basic input/output system (BIOS) of an information handling system during a boot session of the information handling system:

determining if a flag has been set by an operating system of the information handling system indicating that the operating system has applied a secure profile to the BIOS;

if the flag has been set by the operating system of the information handling system indicating that the operating system has applied a secure profile to the BIOS, applying a secure BIOS configuration profile to execution of the BIOS; and performing a BIOS-managed BIOS update based on the secure BIOS configuration profile.

12. The method of claim 11 further comprising, upon completion of the BIOS-managed BIOS update, applying a previous existing user BIOS configuration security profile to execution of the BIOS.

13. The method of claim 11 further comprising, in the BIOS, during a previous boot session occurring before the boot session:

collecting information regarding BIOS configuration security controls; and presenting the information regarding BIOS configuration security controls to the operating system such that the operating system determines, based on the information regarding BIOS configuration security controls, if the operating system will apply a secure profile to the BIOS.

14. An article of manufacture comprising:

a non-transitory computer-readable medium; and computer-executable instructions carried on the computer-readable medium, the instructions readable by a processor, the instructions, when read and executed, for causing the processor to, in a basic input/output system (BIOS) of an information handling system during a boot session of the information handling system:

determine if a flag has been set by an operating system of the information handling system indicating that the operating system has applied a secure profile to the BIOS;

if the flag has been set by the operating system of the information handling system indicating that the operating system has applied a secure profile to the BIOS, apply a secure BIOS configuration profile to execution of the BIOS; and perform a BIOS-managed BIOS update based on the secure BIOS configuration profile.

15. The article of claim 14, the instructions for further causing the processor to, upon completion of the BIOS-managed BIOS update, apply a previous existing user BIOS configuration security profile to execution of the BIOS.

16. The article of claim 14 the instructions for further causing the processor to, in the BIOS, during a previous boot session occurring before the boot session:

collect information regarding BIOS configuration security controls; and present the information regarding BIOS configuration security controls to the operating system such that the operating system determines, based on the information regarding BIOS configuration security controls, if the operating system will apply a secure profile to the BIOS.

* * * * *